United States Patent [19]

Adam et al.

[11] Patent Number: 5,691,459

[45] Date of Patent: Nov. 25, 1997

[54] DISAZO DYES CONTAINING TWO CARBONYLAMINO GROUPS PROCESSES FOR THEIR PREPARATION AND THEIR USE

[75] Inventors: Jean-Marie Adam, Rosenau, France; Peter Sutter, Muttenz, Switzerland

[73] Assignee: Ciba-Geigy Corporation, Tarrytown, N.Y.

[21] Appl. No.: 679,785

[22] Filed: Jul. 15, 1996

[30] Foreign Application Priority Data

Jul. 21, 1995 [CH] Switzerland ............... 2159/95

[51] Int. Cl.⁶ ............... C09B 31/047; D06P 3/24
[52] U.S. Cl. ............... 534/829; 534/643; 8/924
[58] Field of Search ............... 534/643, 829; 8/924

[56] References Cited

U.S. PATENT DOCUMENTS

| | | | |
|---|---|---|---|
| 3,040,024 | 6/1962 | Arlechelm et al. | 260/196 |
| 5,527,889 | 6/1996 | Schaetzer et al. | 534/829 |

FOREIGN PATENT DOCUMENTS

| | | |
|---|---|---|
| 0595768 | 5/1994 | European Pat. Off. |
| 1198990 | 12/1959 | France . |
| 2382484 | 9/1978 | France . |
| 333517 | 10/1958 | Switzerland . |
| 1569062 | 6/1980 | United Kingdom . |

OTHER PUBLICATIONS

Riat et al., Chemical Abstracts, 55:27899 (1961).

*Primary Examiner*—Fiona T. Powers
*Attorney, Agent, or Firm*—Kevin T. Mansfield

[57] ABSTRACT

Azo dyes of the formula

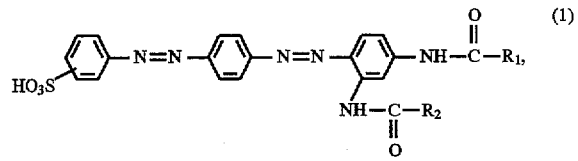

in which $R_1$ and $R_2$ independently of one another are unsubstituted or hydroxy-, $C_1$–$C_4$-alkoxy- or halogen-substituted $C_1$–$C_4$-alkyl or $C_1$–$C_4$-alkoxy;

unsubstituted or $C_1$–$C_4$-alkyl-, $C_1$–$C_4$-alkoxy- or halogen-substituted phenyl or phenoxy; or a radical of the formula —$N(R_3)R_4$, in which $R_3$ und $R_4$ independently of one another are hydrogen, $C_1$–$C_4$-alkyl, or $C_2$–$C_4$-alkanoyl which is unsubstituted or further substituted in the alkyl part by hydroxyl or $C_1$–$C_4$-alkoxy, with the proviso that $R_1$ and $R_2$ are not simultaneously methyl, produce dyeings with good fastnesses on fibre materials containing nitrogen or containing hydroxyl groups.

14 Claims, No Drawings

DISAZO DYES CONTAINING TWO CARBONYLAMINO GROUPS PROCESSES FOR THEIR PREPARATION AND THEIR USE

The present invention relates to novel azo dyes, processes for their preparation and the use of these dyes for dyeing and printing fibre materials, in particular textile fibre materials.

The present invention relates to azo dyes of the formula

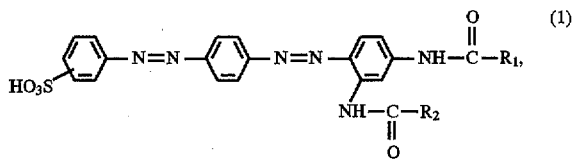

in which $R_1$ and $R_2$ independently of one another are unsubstituted or hydroxy-, $C_1$–$C_4$-alkoxy- or halogen-substituted $C_1$–$C_4$-alkyl or $C_1$–$C_4$-alkoxy;

unsubstituted or $C_1$–$C_4$-alkyl-, $C_1$–$C_4$-alkoxy- or halogen-substituted phenyl or phenoxy; or a radical of the formula —N($R_3$)$R_4$, in which $R_3$ und $R_4$ independently of one another are hydrogen, $C_1$–$C_4$-alkyl, or $C_2$–$C_4$-alkanoyl which is unsubstituted or further substituted in the alkyl part by hydroxyl or $C_1$–$C_4$-alkoxy, with the proviso that $R_1$ and $R_2$ are not simultaneously methyl.

$C_1$–$C_4$Alkyl $R_1$, $R_2$, $R_3$ and $R_4$ independently of one another are, for example, methyl, ethyl, propyl, isopropyl, butyl, secobutyl, tert-butyl or isobutyl, in particular methyl or ethyl. The $C_1$–$C_4$-alkyl radicals $R_1$ and $R_2$ can be further substituted by hydroxyl, halogen, for example bromine or, preferably, chlorine, or in particular by $C_1$–$C_4$-alkoxy, for example ethoxy or, preferably, methoxy. The methoxymethyl radical may be mentioned as an example of corresponding substituted radicals.

$C_1$–$C_4$Alkoxy $R_1$ and $R_2$ independently of one another are, for example, methoxy, ethoxy, propoxy, isopropoxy, butoxy or isobutoxy, in particular methoxy or, preferably, ethoxy. The $C_1$–$C_4$-alkoxy radicals $R_1$ and $R_2$ can be further substituted by hydroxyl, halogen, for example bromine or, preferably, chlorine, or in particular by $C_1$–$C_4$-alkoxy, for example methoxy or ethoxy. The corresponding unsubstituted radicals are preferred.

$C_2$–$C_4$Alkanoyl $R_3$ and $R_4$ independently of one another are, for example, propionyl or, in particular, acetyl. The $C_2$–$C_4$-alkanoyl radicals $R_3$ and $R_4$ can be further substituted by hydroxyl or, in particular, $C_1$–$C_4$-alkoxy, for example methoxy or ethoxy. Preferably, these radicals are further substituted by $C_1$–$C_4$-alkoxy, in particular by methoxy. Methoxyacetyl is particularly preferred here.

Phenyl or phenoxy $R_1$ and $R_2$ are, in addition to the corresponding unsubstituted radicals, the radicals substituted by $C_1$–$C_4$-alkyl, such as methyl, ethyl, propyl, isopropyl, butyl, sec-butyl, tert-butyl or isobutyl, $C_1$–$C_4$-alkoxy, for example methoxy, ethoxy, propoxy, isopropoxy, butoxy or isobutoxy, or by halogen, for example fluorine, bromine or, in particular, chlorine. The corresponding phenyl radicals are preferred here.

$R_3$ is preferably hydrogen or $C_1$–$C_4$-alkyl, in particular hydrogen.

$R_4$ is preferably hydrogen, $C_1$–$C_4$-alkyl, or $C_2$–$C_4$-alkanoyl which is unsubstituted or further substituted in the alkyl part by $C_1$–$C_4$-alkoxy, in particular hydrogen, or $C_2$–$C_4$-alkanoyl which is further substituted in the alkyl part by $C_1$–$C_4$-alkoxy. $R_4$ is particularly preferably hydrogen or methoxyacetyl, in particular hydrogen.

$R_3$ and $R_4$ are especially preferably hydrogen.

$R_1$ is preferably unsubstituted or hydroxy-, $C_1$–$C_4$-alkoxy- or halogen-substituted $C_1$–$C_4$-alkyl or $C_1$–$C_4$-alkoxy; or a radical of the formula —N($R_3$)$R_4$, in which $R_3$ and $R_4$ are as defined and preferred above. Preferably, in this case, $R_3$ is hydrogen and $R_4$ is hydrogen, or $C_2$–$C_4$-alkanoyl which is further substituted in the alkyl part by $C_1$–$C_4$-alkoxy, in particular hydrogen.

$R_1$ is preferably $C_1$–$C_4$-alkoxy; unsubstituted or $C_1$–$C_4$-alkoxy-substituted $C_1$–$C_4$-alkyl; or a radical of the formula —N($R_3$)$R_4$, in which $R_3$ and $R_4$ are as defined and preferred above. Preferably, in this case, $R_3$ is hydrogen and $R_4$ is hydrogen, or $C_2$—$C_4$-alkanoyl which is further substituted in the alkyl part by $C_1$–$C_4$-alkoxy, in particular hydrogen.

$R_1$ is particularly preferably methyl; ethyl; methoxy; ethoxy; methoxy- or ethoxy-substituted methyl; or amino.

$R_1$ is especially preferably methyl; ethyl; ethoxy; methoxy-substituted methyl; or amino. $R_1$ is preferably methyl; ethyl; ethoxy; or methoxy-substituted methyl, in particular methyl.

The radical $R_2$ is as preferred above for the radical $R_1$, ethyl being especially preferred.

Preferably, $R_1$ and $R_2$ independently of one another are unsubstituted or hydroxy-, $C_1$–$C_4$-alkoxy- or halogen-substituted $C_1$–$C_4$-alkyl or $C_1$–$C_4$-alkoxy; or a radical of the formula —N($R_3$)$R_4$, in which $R_3$ is hydrogen and $R_4$ is hydrogen, or $C_2$–$C_4$-alkanoyl which is further substituted in the alkyl part by $C_1$–$C_4$-alkoxy, in particular hydrogen.

Preferably, $R_1$ and $R_2$ independently of one another are $C_1$–$C_4$-alkoxy; unsubstituted or $C_{1-4}$-alkoxy-substituted $C_1$–$C_4$-alkyl; or amino.

$R_1$ and $R_2$ are particularly preferably independently of one another methyl; ethyl; methoxy; ethoxy; methoxy- or ethoxy-substituted methyl; or amino.

$R_1$ and $R_2$ are especially preferably independently of one another methyl; ethyl; ethoxy; methoxy-substituted methyl; or amino, in particular methyl; ethyl; ethoxy; or methoxy-substituted methyl.

Azo dyes of the formula (1) which are of particular interest are those in which $R_1$ is methyl and $R_2$ is ethyl.

The sulfo group in the azo dyes of the formula (1) is preferably bonded in the para-position relative to the azo group.

The present invention furthermore relates to a process for the preparation of azo dyes of the formula (1), which comprises diazotizing an amine of the formula

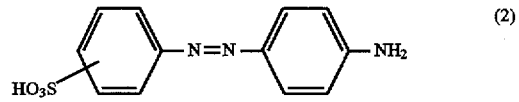

coupling the diazotization product to a coupling component of the formula

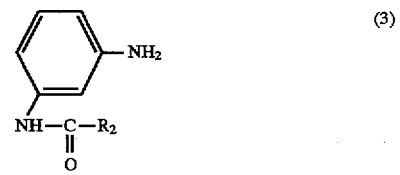

and reacting the resulting reaction product with a compound which introduces the radical of the formula

in which

R₁ and R₂ are as defined under formula (1).

The diazotization of the compound of the formula (2) is carried out in a manner known per se, for example with a nitrite, for example with an alkali metal nitrite, such as sodium nitrite, in a mineral acid medium, for example in a hydrochloric acid medium, at temperatures from, for example, −5° to 40° C., and preferably at 0° to 10° C.

The coupling to the coupling component of the formula (3) is carried out in a manner known per se at acidic, neutral or weakly alkaline pH, for example at a pH from 3 to 7, and at temperatures from, for example, −5° to 30° C., preferably 0° to 25° C.

Compounds of the formula

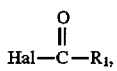

in which

Hal is halogen, such as chlorine, bromine or iodine, in particular chlorine, can be used, for example, for introduction of the radical of the formula (4). Examples of compounds of the formula (5) are acetyl chloride, propionyl chloride, methoxyacetyl chloride and ethyl chloroformate. Further examples of compounds which introduce the radical of the formula (4) are acetic anhydride and propionic arthydride.

The introduction of the radical of the abovementioned formula (4) can be carried out, for example, in dipolar aprotic solvents, for example dimethylformamide or dimethyl sulfoxide, or in water or, preferably, in pyridine, at a temperature from, for example, 10° to 80° C., in particular 10° to 50° C.

In the process according to the invention for the preparation of the azo dyes of the formula (1), the substituents of the compounds of the formulae (2), (3), (4) and (5) are as preferred above.

The compounds of the formulae (2), (3) and (5) are known or can be prepared analogously to known compounds.

The azo dyes of the formula (1) are either in the form of their free acid or, preferably, in the form of salts thereof.

Salts are, for example, the alkali metal or ammonium salts or the salts of an organic amine.

Examples are the sodium, lithium, potassium or ammonium salts or the salt of mono-, di- or triethanolamine.

The azo dyes of the formula (1) according to the invention are suitable, by methods known per se, for dyeing and printing, in particular of fibre materials containing nitrogen or containing hydroxyl groups, for example textile fibre materials of cellulose, silk and, in particular, wool and synthetic polyamides. Dyeing or printing of natural or synthetic polyamide fibre materials is preferred. The azo dyes of the formula (1) according to the invention can be used in the generally customary form, if appropriate prepared beforehand, for dyeing or printing. Level dyeings with good all-round properties, in particular good fastness to rubbing, wet processing, wet rubbing and light, are obtained. Furthermore, the dyes according to the invention are readily water-soluble and can easily be combined with other dyes. The abovementioned textile material can be in the most diverse forms of processing, for example as fibres, yarns, woven fabric or knitted fabric.

In the following Examples, parts are parts by weight. The temperatures are degrees Celsius. Parts by weight bear the same relation to parts by volume as the gram to the cubic centimeter.

EXAMPLE 1

22.2 parts of 4-aminoazobenzene-4'-sulfonic acid are dissolved in 400 parts of water at a temperature of 75° C., and 20 parts of a 4 normal sodium nitrite solution are added. The solution is added dropwise to 400 parts of ice and 20 parts of concentrated hydrochloric acid at a temperature of 030 to 5° C. in the course of 20 minutes. The brown suspension thus obtained is stirred for one hour and the pH is then brought to a value of 4 with a sodium carbonate solution (10%). The diazo suspension is then added dropwise to a coupling solution which comprises 150 parts of 3-aminophenylurea hydrochloride in 400 parts of water and 63.5 parts of 1 normal sodium hydroxide solution at a temperature of 0° to 5° C. in the course of 60 minutes. During the coupling, the pH is kept at a value of 5. The mixture is allowed to react completely at a temperature of 0° to 5° C. for 2 hours and then at room temperature overnight. The brown suspension is filtered and the residue is washed with water. The moist residue is then stirred with 1000 parts of water and the pH is brought to a value of 8 with 67 parts of 1 normal sodium hydroxide solution. 70 parts of sodium chloride are added at a temperature of 60° C. and the fine suspension is filtered at a temperature of 50° C. After drying, a compound which, in the form of the free acid, corresponds to the formula

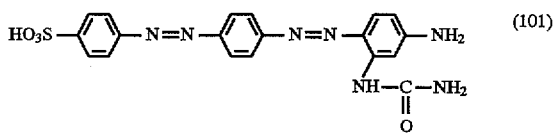

is obtained.

EXAMPLES 2 to 4

The compounds of the formulae

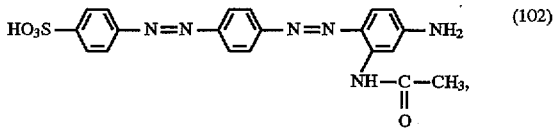

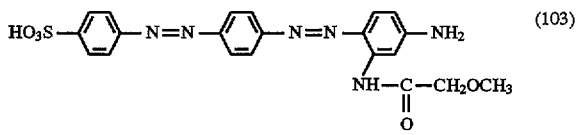

and

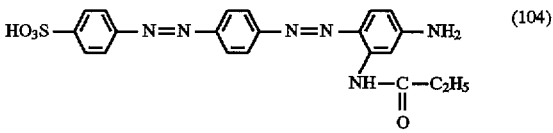

can be obtained in a manner analogous to that described in Example 1.

EXAMPLE 5

6.6 parts of the compound of the formula (104) are stirred in 150 parts of pyridine, and 5.9 parts of acetyl chloride are added dropwise in the course of 10 minutes, the temperature rising to 45° C. The reaction mixture is subsequently stirred for one hour and 50 parts of methanol are then added. The orange-coloured suspension is poured onto 750 parts of a concentrated aqueous sodium chloride solution and filtered and the residue is washed with a 5% aqueous sodium chloride solution and with methanol. After drying, a dye which, in the form of the free acid, corresponds to the compound of the formula

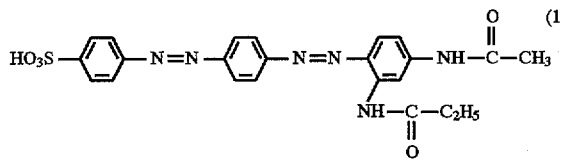 (105)

is obtained. The dye of the formula (105) dyes wool and polyamide in orange colour shades.

EXAMPLES 6 to 14

The procedure in Example 5 is repeated, but using an equimolar amount of one of the compounds of the formulae (101), (102) and (103), where appropriate, instead of 6.6 parts of the compound of the formula (104), and an equimolar amount of propionyl chloride or methoxyacetyl chloride, where appropriate, instead of 5.9 parts of acetyl chloride. The dyes, shown in the form of the free acid, of the formulae

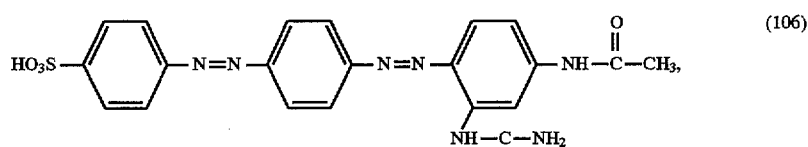 (106)

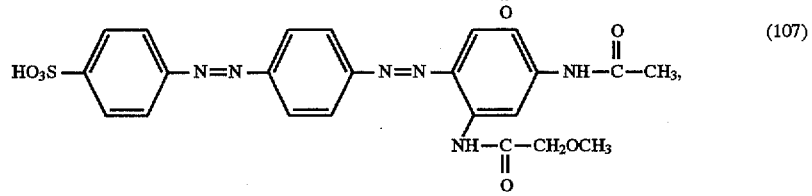 (107)

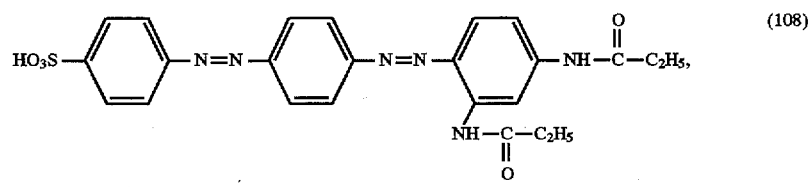 (108)

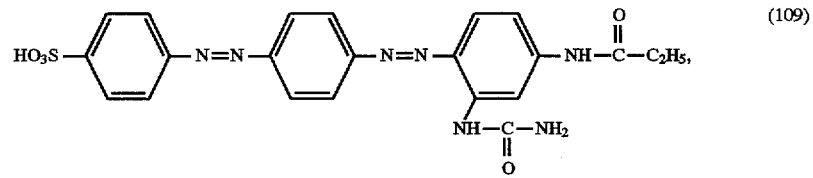 (109)

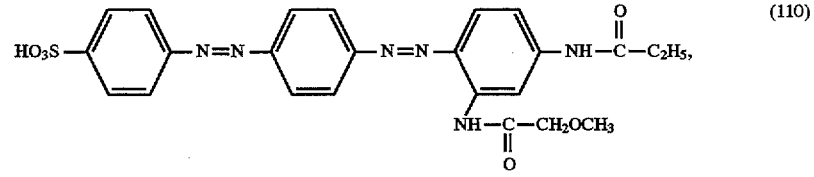 (110)

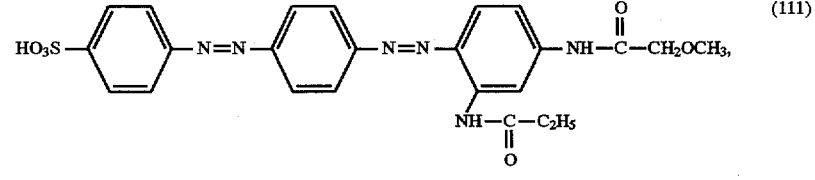 (111)

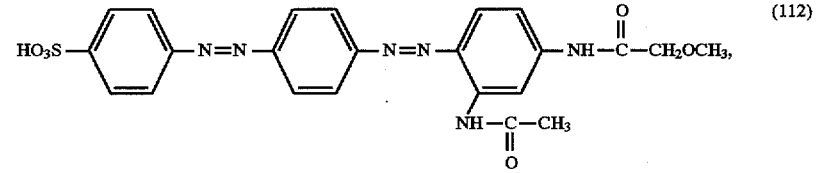 (112)

-continued

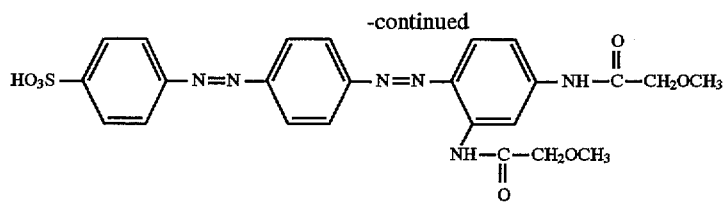

and

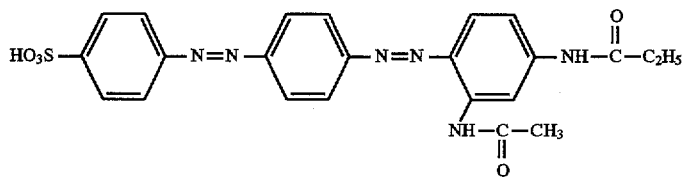

are obtained. The dyes of the formulae (106) to (114) dye wool and polyamide in orange colour shades.

EXAMPLE 15

The procedure described in Example 5 is repeated, but using an equimolar amount of the compound of the formula (10) instead of 6.6 parts of the compound of the formula (104), and an equimolar amount of methoxyacetyl chloride instead of 5.9 parts of acetyl chloride. A dye which, in the form of the free acid, corresponds to the compound of the formula

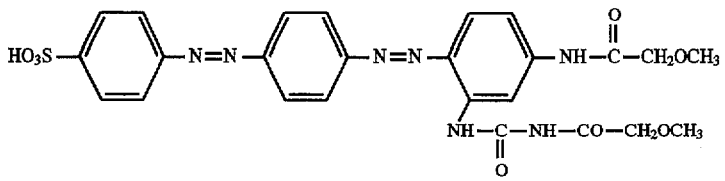

is obtained. The dye of the formula (115) dyes wool and polyamide in orange colour shades.

EXAMPLE 16

4.4 parts of the compound of the formula (102) are stirred in 50 parts of pyridine at a temperature of 80° C. 6.5 parts of ethyl choroformate are then added dropwise at a temperature of 25° C. in the course of 10 minutes, during which the temperature rises to 42° C. The mixture is subsequently stirred at this temperature for one hour and 75 parts of methanol and 25 parts of a 25% aqueous sodium chloride solution are then added to the reaction mixture at room temperature. The suspension is filtered and the residue is washed with a 10% aqueous sodium chloride solution and with methanol. The moist residue is then recrystallized from a mixture of alcohol and water in the ratio 1:1. After drying, 2.8 parts of a dye which, in the form of the free acid, corresponds to the compound of the formula

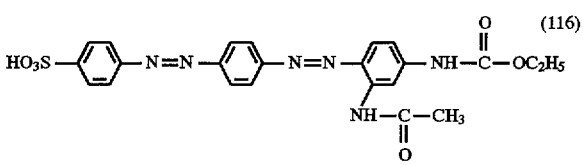

are obtained. The dye of the formula (116) dyes wool and polyamide in orange colour shades.

EXAMPLES 17 to 19

The procedure described in Example 16 is repeated, but using an equimolar amount of one of the compounds of the formulae (101), (103) and (104) instead of 4.4 parts of the compound of the formula (102). The dyes, shown in the form of the free acid, of the formulae

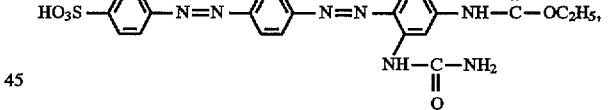

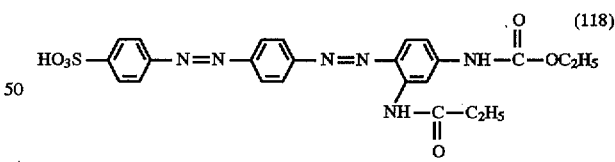

and

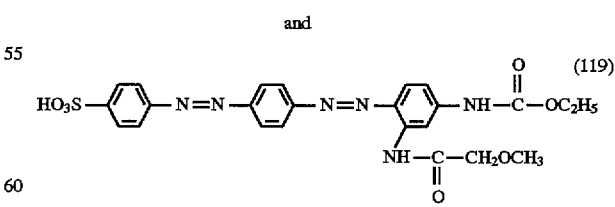

are obtained. The dyes of the formulae (117), (118) and (119) dye wool and polyamide in orange colour shades.

EXAMPLE 20

4.4 parts of the compound of the formula (102) are stirred in 70 parts of water at room temperature, and 3 parts of triethylamine and 10 parts of acetone are added. 5.7 parts of methyl chloroformate are added dropwise to the orange solution in the course of 10 minutes, during which the temperature rises to 32° C. The pH is kept at a value of 7 here by addition of an aqueous, 1 normal sodium hydroxide solution. After addition of 20 parts of acetone, the mixture is stirred for 30 minutes and 50 parts of methanol are then added. The mixture is then stirred for 20 minutes and the product is filtered off and washed successively with 40 parts of a 5% sodium chloride solution, 50 parts of ethanol and 20 parts of methanol. After drying, 4 parts of a dye which, in the form of the free acid, corresponds to the formula

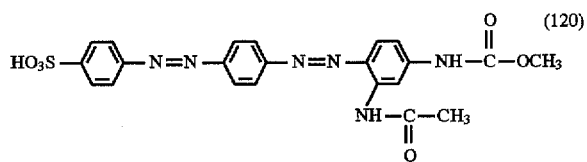

are obtained. The dye of the formula (120) dyes wool and polyamide in orange colour shades.

EXAMPLE 21 and 22

The procedure described in Example 20 is repeated, but using an equimolar amount of one of the compounds of the formulae (101) and (104) instead of 4.4 parts of the compound of the formula (102). The dyes, shown in the form of the free acid, of the formulae

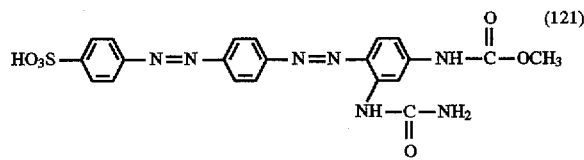

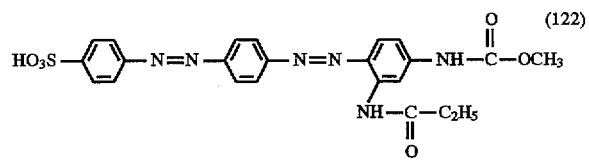

are obtained. The dyes of the formulae (121) and (122) dye wool and polyamide in orange colour shades.

DYEING EXAMPLE 1 part of a levelling assistant (based on the condensation product of a higher aliphatic amine and ethylene oxide) is added to 2000 parts of demineralized water at room temperature. The bath is then brought to a pH of 6 with acetic acid. 0.5 part of the dye of the formula (105) according to Example 5 is then added. 100 parts of polyamide 6,6 fibre material (Helanca tricot) are introduced into the resulting dye solution and the dyebath is heated to a temperature of about 96° C. in the course of 45 minutes. The temperature is maintained for 45 to 60 minutes, the bath is then cooled to a temperature of 70° C. and the dyed goods are removed and rinsed with water and then dried. A fabric dyed in an orange colour shade is obtained.

What is claimed is:

1. An azo dye of the formula

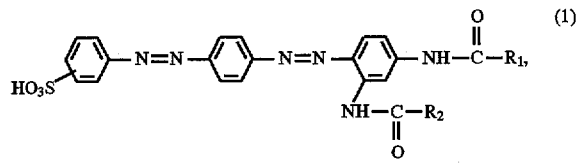

in which

R$_1$ and R$_2$ independently of one another are unsubstituted or hydroxy-, C$_1$–C$_4$-alkoxy- or halogen-substituted C$_1$–C$_4$-alkyl or C$_1$–C$_4$-alkoxy;

unsubstituted or C$_1$–C$_4$-alkyl-, C$_1$–C$_4$-alkoxy- or halogen-substituted phenyl or phenoxy; or a radical of the formula —N(R$_3$)R$_4$, in which R$_3$ und R$_4$ independently of one another are hydrogen, C$_1$–C$_4$-alkyl, or C$_1$–C$_4$-alkanoyl which is unsubstituted or further substituted in the alkyl part by hydroxyl or C$_1$–C$_4$-alkoxy, with the proviso that R$_1$ and R$_2$ are not simultaneously methyl.

2. An azo dye according to claim 1, in which R$_3$ is hydrogen.

3. An azo dye according to claim 1, in which R$_4$ is hydrogen, or C$_2$–C$_4$-alkanoyl which is further substituted in the alkyl part by C$_1$–C$_4$-alkoxy.

4. An azo dye according to claim 1, in which R$_3$ and R$_4$ are hydrogen.

5. An azo dye according to claim 1, in which R$_1$ and R$_2$ independently of one another are unsubstituted or hydroxy-, C$_1$–C$_4$-alkoxy- or halogen-substituted C$_1$–C$_4$-alkyl or C$_1$–C$_4$-alkoxy; or a radical of the formula —N(R$_3$)R$_4$, in which R$_3$ is hydrogen and R$_4$ is hydrogen, or C$_2$–C$_4$-alkanoyl which is further substituted in the alkyl part by C$_1$–C$_4$-alkoxy.

6. An azo dye according to claim 1, in which R$_1$ and R$_2$ independently of one another are C$_1$–C$_4$-alkoxy; unsubstituted or C$_1$–C$_4$-alkoxy-substituted C$_1$–C$_4$-alkyl; or amino.

7. An azo dye according to claim 1, in which R$_1$ and R$_2$ independently of one another are methyl; ethyl; methoxy; ethoxy; methoxy- or ethoxy-substituted methyl; or amino.

8. An azo dye according to claim 1, in which R$_1$ and R$_2$ independently of one another are methyl; ethyl; ethoxy; methoxy-substituted methyl; or amino.

9. An azo dye according to claim 1, in which R$_1$ and R$_2$ independently of one another are methyl; ethyl; ethoxy; or methoxy-substituted methyl.

10. An azo dye according to claim 1, in which R$_1$ is methyl and R$_2$ is ethyl.

11. An azo dye according to claim 1, in which the sulfo group in the azo dye of the formula (1) is bonded in the para-position relative to the azo group.

12. A process for the preparation of an azo dye according to claim 1, which comprises diazotizing an amine of the formula

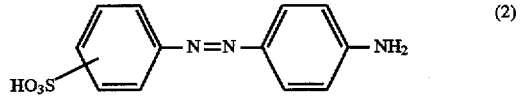

coupling the diazotization product to a coupling component of the formula

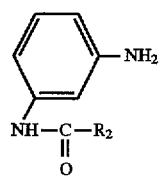
(3)

and reacting the resulting reaction product with a compound which introduces the radical of the formula

(4)

in which $R_1$ and $R_2$ are as defined in claim 1.

13. A process for dyeing or printing fibre material containing nitrogen or containing hydroxyl groups, which process comprises the step of applying to said fibre material a tinctorial amount of an azo dye according to claim 1.

14. A process according to claim 13 wherein said fibre material is natural or synthetic polyamide fibre material.

* * * * *